United States Patent
Buhlmann

(10) Patent No.: US 8,366,854 B2
(45) Date of Patent: Feb. 5, 2013

(54) METHOD FOR PRODUCING A LAMINATE

(75) Inventor: Carsten Buhlmann, Rangsdorf (DE)

(73) Assignee: Surface Technologies GmbH & Co., KG, Baruth (DE)

( * ) Notice: Subject to any disclaimer, the term of this patent is extended or adjusted under 35 U.S.C. 154(b) by 168 days.

(21) Appl. No.: 12/809,514

(22) PCT Filed: Dec. 22, 2008

(86) PCT No.: PCT/EP2008/068171
§ 371 (c)(1),
(2), (4) Date: Aug. 25, 2010

(87) PCT Pub. No.: WO2009/080813
PCT Pub. Date: Jul. 2, 2009

(65) Prior Publication Data
US 2010/0307675 A1    Dec. 9, 2010

(30) Foreign Application Priority Data
Dec. 21, 2007   (DE) .......................... 10 2007 062 941

(51) Int. Cl.
B44C 1/165 (2006.01)
B29C 65/02 (2006.01)
B32B 37/02 (2006.01)
B32B 37/06 (2006.01)
B32B 37/16 (2006.01)
B32B 38/14 (2006.01)
B32B 38/16 (2006.01)
B44C 1/24 (2006.01)
B32B 38/18 (2006.01)

(52) U.S. Cl. .................. 156/235; 156/307.1; 156/307.3; 156/309.9

(58) Field of Classification Search .... 156/307.1–309.9, 156/235
See application file for complete search history.

(56) References Cited

U.S. PATENT DOCUMENTS

| | | | |
|---|---|---|---|
| 3,313,675 A * | 4/1967 | Petropoulos et al. | 428/414 |
| 4,244,990 A * | 1/1981 | Mayerhoffer | 427/211 |
| 4,451,317 A * | 5/1984 | Oizumi et al. | 156/307.3 |
| 6,309,492 B1 * | 10/2001 | Seidner | 156/94 |
| 6,423,167 B1 * | 7/2002 | Palmer et al. | 156/209 |
| 7,799,735 B2 * | 9/2010 | Segall et al. | 503/227 |
| 7,981,242 B2 * | 7/2011 | Brown | 156/307.3 |
| 8,016,969 B2 * | 9/2011 | Oldorff | 156/240 |
| 2009/0155612 A1 * | 6/2009 | Pervan et al. | 428/498 |

FOREIGN PATENT DOCUMENTS

| | | |
|---|---|---|
| DE | 26 22 642 | 12/1976 |
| DE | 2622642 A1 * | 12/1976 |
| DE | 29 17 170 | 11/1979 |
| DE | 202005008692 | 9/2005 |
| EP | 0472 036 | 2/1992 |
| EP | 472036 | 2/1992 |
| EP | 0519242 A | 12/1992 |
| EP | 1249322 | 10/2002 |
| EP | 1420126 A | 5/2004 |
| EP | 1454763 A | 9/2004 |
| EP | 1749676 A | 2/2007 |
| EP | 1820640 A | 8/2007 |
| GB | 1524907 A * | 9/1978 |
| GB | 1525419 A * | 9/1978 |
| WO | 02/45955 A | 6/2002 |
| WO | 2005/042644 | 5/2005 |
| WO | 2005/051661 AY | 6/2005 |
| WO | 2006/037644 | 4/2006 |
| WO | 2007/042258 | 4/2007 |

OTHER PUBLICATIONS

English translation of DE19532819.*
English translation of DE202005008692.*
English translation of EP1249322.*
English translation of EP1749676.*
English translation of EP1820640.*
English translation of WO03095202.*
English translation of WO2005/042644.*
English translation of WO2006/002917.*
English translation of WO2007/042258.*
English translation of abstract of WO2006002917; Jan. 2006.*
English translation of WO2006037644; Apr. 2006.*

* cited by examiner

*Primary Examiner* — Sonya Mazumdar
(74) *Attorney, Agent, or Firm* — Lucas & Mercanti, LLP

(57) ABSTRACT

The invention relates to a method for producing a decorated laminate having a plate-shaped core made of wood or wood material, a decorative layer on at least one side of the core, and a cover layer made of aminoplast on the decorative layer, comprising the following steps: attaching the decorative layer, applying a layer made of an aqueous solution of an aminoplast precursor to form a cover layer on the decorative layer, at least partially drying the cover layer, curing the aminoplast under pressure and heat, wherein a part of said solution of said aminoplast precursor is initially applied and the partial layer thus generated is dried and said step is repeated at least twice, in order to form the final cover layer.

25 Claims, No Drawings

METHOD FOR PRODUCING A LAMINATE

This is a National phase of PCT/EP2008/068171 filed Dec. 22, 2008, which claims the priority of DE 10 2007 062 941.0 filed Dec. 21, 2007, all applications are incorporated by reference herein.

The invention concerns a process for producing a laminate, in particular a laminate having a carrier based on wood materials with a decoration and layers which contain aminoplasts.

Such laminates are used in many different situations for example for floors, wall and ceiling claddings, working panels and furniture. The decoration can imitate for example another material, for example wood, ceramic, natural or artificial stone or can take account of artistic or practical aspects. Usually the decoration is protected from wear by a more or less transparent thermoplastic cover layer. It is also usual for the surface of that cover layer to be provided with a structure which corresponds to the material imitated by the decoration and which is referred to as Synchronpore.

Technical development hitherto has led essentially to two different groups of materials for the cover layers. So-called lacquer layers are formed from compositions which contain components which by heat and/or radiation can be polymerised and/or crosslinked and thereby hardened, such as for example acrylates, epoxies, maleimides.

The second group of material used for the cover layers includes the so-called aminoplasts. That term is used to denote polycondensation products of carbonyl compounds, in particular formaldehyde, and compounds containing amino groups such as for example urea, melamine and urethane. Production of the layers in the laminate is usually implemented by employing aqueous solutions of condensation products of a carbonyl compound and amine with an excess of the carbonyl compound which crosslink upon drying and heating to give a thermosetting structure. As in that case both the water present as the solvent and also the water which occurs in the condensation reaction escapes in the form of vapour hardening must be effected at least substantially in a press so that the product acquires the desired strength and surface quality.

Laminate layers of aminoplasts admittedly have excellent resistance to light, soiling, various solvents and the effect of heat, but they are comparatively brittle. Therefore it has long been usual for them to be reinforced by fibre materials such as paper and/or nonwoven materials of α-cellulose. That is effected for example by the decoration being printed onto a paper which is thereafter impregnated with aminoplast and by so-called overlay comprising paper also charged with aminoplast being used for the cover layer. After pressing and hardening however the carrier of cellulose fibres remains in the cover layer and can adversely affect the recognisability of the decoration. Further disadvantages of the overlay paper are the relatively high costs due to production and storage as well as the limited durability of the aminoplast-impregnated paper. EP 21588 therefore proposes using a melamine-formaldehyde resin, without cellulose, which is modified with polyvinyl alcohol, as the cover layer. That however involves a special product with increased costs for production and storage and limited durability.

To increase the resistance to abrasion of the finished laminate, which is of significance in particular for use as a floor covering, a finely divided hard solid material such as silicon dioxide, aluminium oxide, silicon carbide, boron nitride, has long been incorporated into one or more of the layers forming the laminate structure. For example that hard solid material can be incorporated into the overlay paper or decoration paper impregnated with resin or lacquer (for example WO 2005/042644-A1) or can be applied as a dispersion in production of the layer structure (for example DE 20 2005 008 692 U2) or can be applied by scattering in the dry condition (EP 1 249 322, WO 2005/042644-A1). It is however undesirable for the solid particles to protrude from the outermost layer of the laminate structure as that adversely affects appearance and touch of the product and processing apparatuses, for example presses, can be damaged thereby.

In the development in the recent past therefore radiation-hardening lacquers are preferred in relation to aminoplasts, for forming the laminate layers. Thus for inexpensively providing a panel with a decorative surface and high abrasion values, WO 2007/042258 proposes applying a lacquer to the decorative surface, placing abrasion-resistant particles thereon, applying a further lacquer layer and hardening the applied lacquer layers. Hardening of the lacquer is preferably effected by UV radiation. During the hardening operation the lacquer layers are covered with a structure-imparting film which also keeps away oxygen in the air, which would adversely affect the hardening operation.

Lacquer-coated laminates are also described in the literature (Parkettmagazin May 2007, pages 49 to 51). Such laminates have a plurality of lacquer layers over the decoration that is applied by printing; firstly those which contain corundum, thereafter grinding and smoothing lacquer, a cover lacquer and a cover pore material. A method and an apparatus for the production of such laminates are disclosed in WO 2006/037644-A2. The apparatus includes a plurality of processing stations which in turn each include an applicator roller and a post-processing station in which hot air or radiation acts on the applied lacquer layer with at least partial drying and hardening. Those laminates no longer need to contain any cellulose components due to applying the decoration by printing and due to the use of priming and cover layers of radiation-hardening lacquer. The lacquer surfaces of the described laminates should be softer than the surfaces of melamine resin laminates and should feel warmer.

DE 20 2005 008 692 U2 describes a panel of wood material with a surface coating comprising a primer and produced thereon at least one lacquer layer. To avoid unwanted structures in the surface such as a roll structure or an orange peel effect it is proposed that the lacquer is applied in a plurality of thin layers, wherein the layer which has respectively already been applied is subjected to incipient gelling, that is to say partially crosslinked.

Nonetheless the aminoplast-based laminates have advantages over those with lacquer layers. Thus at the present time the raw material costs for lacquers are a multiple of the costs for aminoplasts. In addition the surface quality and the internal freedom from defects are to better controlled by the necessary pressing operation and the hardening procedure is not influenced by oxygen in the air. There is therefore a need to develop the process for producing decorative laminates in such a way that it is less expensive and can be more flexibly performed and leads to laminates having improved properties.

EP 472036 discloses decorative laminates in which a mix of melamine-formaldehyde resins and aluminium oxide particles is applied to decorative paper. The paper impregnated in that way is again dipped into the mix or into the pure melamine-formaldehyde resin, the amount applied being metered by means of suitable means, for example a stripping roller. Thereafter the laminate is consolidated by pressure and heat. That so-called "wet-in-wet" method gives laminate surfaces within improved strength in relation to mechanical stresses. It is however not possible to reliably avoid aluminium oxide particles protruding from the surface.

The object of the invention is to provide a process with which decorative laminates having a plate-shaped core of wood or wood material, a decorative layer on at least one side of the core and a cover layer of an aminoplast on the decorative layer can be easily and economically produced without using a cellulose-bearing overlay, of excellent quality and with outstanding mechanical properties.

That object is attained by a process as set forth herein.

More specifically it was found that the mechanical properties of the aminoplast in the cover layer are excellent even without using a cellulose-bearing overlay if the cover layer is applied from an aqueous solution of the aminoplast in a plurality of sublayers which are respectively subjected to incipient drying after application. Due to that initial drying effect the viscosity of the applied sublayer is increased as a consequence of the increase in the solids content to such an extent that when the next sublayer is applied the sublayers therebeneath are not damaged. In contrast no hardening and crosslinking due to polycondensation occurs in that initial drying step.

According to the invention at least three sublayers, preferably four to six sublayers, are applied.

For simplification in accordance with this application the terms aminoplast and melamine-formaldehyde resin are used both for the solutions of preliminary stages with a low degree of polymerisation and also for the dried and heat-treated, hardened products. It will be apparent to the man skilled in the art from the context, what is meant in detail.

The plate-shaped core comprises wood or a wood material, preferably medium-density (MDF) or high-density (HDF) fibreboard. Preferred dimensions are about 2×3 m with a thickness of about 5 to 25 mm.

Any known coating method can be used for applying the sublayers such as curtain coating, spray coating, dip coating. The roller coating method is particularly preferred, in which case the applied amount can be controlled with doctors and/or raster surfaces.

Initial drying of the layers is preferably effected in a flow of hot air and/or by IR radiation. It is in any event desirable to remove the water vapour escaping from the sublayer by an air flow passed over the panel. The temperature at the surface of the sublayer should be not more than 20 K above the ambient temperature so that no hardening occurs.

Of the known aminoplasts melamine-formaldehyde resins are particularly preferred. Suitable products are commercially available. However other aminoplasts such as for example urea-formaldehyde resins can also be used according to the invention. It is advantageous to use a solution of the aminoplast with at least 60 percent by weight of solid material. Due to the initial drying the solids content in the applied sublayer should rise to a value above 80 percent by weight. The viscosity of the applied solution of the aminoplast is preferably between 100 and 200 mPas. It is particularly preferred to apply the first sublayer at lower viscosity and the subsequent sublayers at higher viscosity, that is to say so that the viscosity rises with the layer sequence. The viscosity of the aminoplast solution can also be set to be higher with thickening agents, for example polysaccharides such as xanthane gum.

In a preferred embodiment according to the invention particles of a hard solid material are applied with the first sublayer. Those particles are embedded in the cover layer after complete application of the layer. After hardening of the lacquer they cause an improvement in the resistance to abrasion. It is possible for those particles to be dispersed in the solution of the aminoplast for the first sublayer. In that respect it is to be borne in mind that the particles can lead to increased wear of the application apparatus. For example an applicator roller of ceramic can be used because of the higher resistance to wear. Advantageously the particles can also be scattered on the first sublayer prior to initial drying thereof.

It may be desirable also to incorporate solid particles into the second sublayer as long as they are reliably covered by the following sublayers.

In particular aluminium oxide, silicon dioxide, silicon carbide and boron nitride can be used as the hard solid materials. In terms of selection the colour of the solid material can be such that it does not unpleasantly stand out from the decoration. The particle size can be 30 to 250 µm. A preferred mean particle size for the hard solid material is between 180 and 220 µm.

The amount of the hard solid material used is desirably between about 10 and 50, preferably being 15 to 20 g per square meter.

The thicknesses of sublayers are preferably such that the first sublayer is thinner than the mean particle size of the solid material. In that case the particles initially project out of the sublayer. By virtue of the initial drying effect however they are fixed in their vertical position. The following sublayers now fill the intermediate spaces between the particles and lie on the previous applied sublayers. After all sublayers have been applied the thickness of the overall cover layer is then greater than the particle size so that the particles are completely embedded in the cover layer. It is now no longer for individual particles to project undesirably outwardly from the cover layer.

The sublayers can each be of the same thickness or of different thicknesses. A suitable range for the layer thickness is between 20 and 60 µm, corresponding to a wet application weight of about 40 to 120 g per square meter.

Nanoparticles can be incorporated at least in the last, outwardly disposed sublayer to improve scratch protection. They preferably comprise aluminium oxide or silicon dioxide and are preferably of a size of 5 to 100 nm. The use of such nanoparticles for scratch protection is known per se. As however they act only at the surface it is economical for them to be used only in the outer sublayer.

For scratch protection it is also possible to incorporate lubricants such as polyvinyl alcohol or polyethylene glycol stearate, alone or in combination with nanoparticles, at least into the outermost sublayer.

It is basically possible for an impregnated decorative paper to be applied to one side of the plate-shaped core prior to application of the cover layer, in known manner. Preferably however a decorative paper or a one-coloured paper, in each case without impregnation, is placed on a layer of fluid glue, previously applied to the core. That paper can then be pressed against the core by means of a calender roller and fixed. Advantageously the glue can be caused to set by heat. It can than be hardened either by the heated calender roller or during hardening of the aminoplast of the cover layer under pressure and heat at the conclusion of the process. The glue used can be for example a combination of urea-formaldehyde glue 1206 with the hardener 2547 from Akzo Nobel. In that case advantageously firstly a thin layer of the hardener is applied and thereafter the glue is applied, in the necessary layer thickness, whereupon the paper can then be placed directly thereon. Advantageously in that case the decorative paper or one-coloured paper is processed from the roll, which is easier than handling sheet material.

If a one-coloured, in particular white paper is used, that can serve as a background for applying a decoration by printing thereon. There is then no longer any need to apply other coating such as primer or rolling base as a print carrier, as described in the state of the art. Any known method such as for example intaglio printing, indirect intaglio printing, flexo-printing or offset printing can be used for the printing operation. Preferably a digital printing method is used, in which the decoration can be used stored in digital form, in particular an ink jet printing method.

The described process makes it possible to produce a decorated laminate which has respectively a decorative layer and a cover layer either on one or both sides of the plate-shaped core. In most cases however it is sufficient to provide a decorative layer and a cover layer only on one side of the core. Usually a so-called stabilising layer is applied in that case on the other side in order to avoid deformation of the laminate upon a change in temperature and air humidity as a consequence of the differing reactions of the core and the aminoplast. The process according to the invention is performed in a particularly economical fashion if that stabilising layer is applied simultaneously with application of the decorative layer and application of the cover layer. That can advantageously be effected by the stabilising layer also being applied in the form of a plurality of sublayers of aminoplast, wherein each sublayer is at least initially dried prior to application of the next sublayer to such an extent that it is not damaged by the application of the next layer. Particularly advantageously the sublayers of the stabilising layer can be respectively applied simultaneously with the sublayers of the cover layer and subjected to initial drying.

For further stabilisation of the stabilising layer a paper layer can be applied prior to application on the side opposite to the cover layer of the plate-shaped core. Preferably that is effected simultaneously with and in the same manner as application of the decorative paper or one-coloured paper on the decorative side of the core.

After application of the decorative layer, the complete cover layer and optionally the stabilising layer on the plate-shaped core the laminate is heated under pressure. That causes crosslinking and hardening of the aminoplast. Particularly suitable apparatuses for that purpose are on the one hand short-cycle presses (SC presses) and on the other hand double belt presses. Typical values for pressure and temperature at the workpiece are about 20 to 60 kN/cm$^2$ and 160 to 180° C. During the pressing operation the surface structure of the laminate is produced by the surface of the pressing tool, that is in contact with the laminate. For that purpose uniform or endless embossing films can be placed in the press. The surface structure can be brought into conformity with the decoration of the decorative layer in known manner. That is facilitated by the fact that the decoration does not shrink due to impregnation of the paper. Depending on the respective embossing film, both high-sheen and also matt surfaces, and positive or negative pores conforming with a decoration imitating a natural substance (wood, stone and so forth) can be formed.

The decorative paper or one-coloured paper is generally initially not impregnated with glue upon application to the plate-shaped core, by means of a liquid glue. Spatially limited penetration of the glue could even disrupt the appearance of the decoration in the finished laminate. It is only in the operation of pressing the laminate structure under heating that the paper is surprisingly reliably uniformly impregnated with the aminoplast and joined to the core and the cover layer to afford a firm fixed structure. That means that there is a clear relationship between the decoration and the surface structure of the embossing film so that for example the same data set can be used for digital printing of the decoration, as in the production of the embossing film.

The decorative laminates produced by the process according to the invention are distinguished by a high level of strength, a pleasant feel and clear recognisability of the decoration.

The process according to the invention permits in particular inexpensive and more flexible production of decorated laminates. In particular the replacement of the cellulose-bearing overlay by a plurality of sublayers of aminoplast reduces the material costs because there is now no longer any need for a preliminary working operation for impregnation of the overlay and controlled storage of the only limitedly storable overlay is eliminated. In addition the equipment setting times upon changes in product are shortened whereby production can be more flexibly organised and the stored stock of finished product can be reduced. The use of decorative paper or one-coloured paper without impregnation permits the use of less expensive papers with a lower grammage. A corresponding simplification and cost reduction can be implemented in the case of the stabilising layer, particularly if it is applied simultaneously with the cover layer.

Embodiment 1

MDF panels measuring about 2×3 m in size are cleaned, smoothed and subjected to heat-treatment. An acid hardener for urea-formaldehyde glue (hardener 2547-Akzo Nobel) is applied by means of a roller coating installation, at ambient temperature, with an application weight of 5 to 8 g/square meter and slightly initially dried with an IR radiating device so that the layer can withstand the following roller application of glue (urea-formaldehyde glue 1206-Akzo Nobel) with an application weight of 30 to 40 g/m$^2$. A printed decorative paper is placed on the still wet glue from the roll and pressed in a calender under 160 kN/cm$^2$ and at a roller temperature of 190° C. Thereafter the paper is cut in the gap between the individual panels. The gap between the individual panels introduced into the calender is so controlled that the decorative paper lies in accurate register relationship on each panel. The liquid glue is prevented from penetrating through the paper by suitable adjustment of the application of glue and of the viscosity of the glue. The panels can then be passed through a smoothing calender and/or brushed to remove dust adhering thereto.

The panels are further conveyed in a horizontal position. A layer of melamine resin in water is now applied to the decorative paper on the top side of the panel by means of an applicator roller (of ceramic for the sake of a low rate of wear), the layer of melamine resin containing particles of aluminium oxide (corundum) of a mean size of 180-220 μm. The viscosity of the resin solution is 120 mPas with a solids content of 60 percent by weight. The application weight of the resin solution is about 50 g/m$^2$, that of the corundum is 15-20 g/m2. The application of resin is not sufficient to completely cover the corundum particles. The resin application weight corresponds to a layer thickness of about 40 μm (density 1.25 g/cm$^3$). The resin application is subjected to initial drying by means of an IR radiating device to such an extent that its surface is bone dry and has sufficient adhesion to the decorative paper. In that case an air flow is passed over the surface of the resin layer. Simultaneously with the application of resin to the top side, an identical application but without corundum is applied to the underside as a stabilising layer and subjected to initial drying. In the conveying process the panel firstly rests on an air cushion and after the initial drying operation on narrow rollers in the edge region.

After the initial drying a further layer of about 50 g/m$^2$ of the aqueous melamine resin is applied to the decorative side and to the underside and once again initially dried. That process is also repeated up to three times. As a result the resin layer is now of a thickness of up to 250 μm and completely covers the corundum particles.

The panel now coated with a useful layer and the stabilising layer is placed in an SC press and pressed for about 10-15 s at a temperature of the pressing plates of about 200° C. (corresponding approximately to 160° C. at the product) and under a pressure of 35-40 kN/cm². In that case the surface relief corresponding to the decoration is embossed (Synchronpore).

Embodiment 2

MDF panels measuring about 2×3 m are cleaned, smoothed and heat-treated. By means of a roller coating installation an acid hardener for urea formaldehyde glue (hardener 2547-Akzo Nobel) is applied with an application weight of about 8 g per square meter at ambient temperature and slightly dried with an IR radiating device. Thereupon a glue layer of about 40 g per square meter (urea formaldehyde glue 1206-Akzo Nobel) is again applied with a roller. A cream-coloured printing base paper of a weight in relation to surface area of 60 g per square meter is applied by the roller to the glue layer while still wet and pressed in a calender at 160 kN/cm² and at a roller temperature of 190° C., the glue being at least partially hardened. In that case the outside surface of the paper remains unchanged, that is to say no glue penetrates through. Thereafter the paper is cut in the gap between the panels. The panels are immediately conveyed to a printing station in which a first colour of the decoration is applied by means of indirect intaglio printing. In a further printing station the second and third colours are applied, in which case brief airing between the stations is sufficient to dry the printing ink. Now a thin layer of a melamine formaldehyde resin (MFR, about 10 g/m²) is applied and dried with an IR radiating device until the surface is bone-dry. In that condition the panels can be stacked or stored.

Further processing of the decorated panels is effected either directly after the printing operation (without application of the thin MFR layer) or after application of that layer and storage by application of the cover layer as described in Embodiment 1.

The invention claimed is:

1. A process for producing a decorated laminate comprising the steps of:
    (a) applying a decorative layer on at least one side of a plate shaped core of wood or wood material;
    (b) applying an aqueous solution of aminoplast precursor to the decorative layer to form a cover sublayer of aminoplast precursor on the decorative layer;
    (c) pre-drying the cover sublayer of aminoplast precursor to increase the viscosity while not hardening or crosslinking the cover sublayer of a aminoplast precursor;
    (d) repeating steps (b) and (c) in sequential order at least twice to form at least three cover sublayers of pre-dried aminoplast precursor on the decorative layer; and
    (e) hardening and crosslinking the at least three cover sublayers of aminoplast precursor under pressure and heat to form a cover layer on the decorative layer.

2. The process according to claim 1, wherein pre-drying is effected with IR radiation and/or hot air.

3. The process according to claim 2, wherein the aminoplast is a melamine-formaldehyde resin.

4. The process according to claim 3, wherein the aqueous solution of aminoplast precursor has more than 60 percent by weight of solid material.

5. The process according to claim 4, wherein each cover sublayer of aminoplast precursor is pre-dried to more than 80 percent by weight of solid material.

6. The process according to claim 5, wherein the viscosity of the aqueous solution of aminoplast is 100 to 200 mPas.

7. The process according to claim 6, wherein the viscosity of each cover sublayer of aminoplast precursor increases with the cover sublayer sequence.

8. The process according to claim 1, wherein particles of a hard solid material are applied at least with the cover sublayer of aminoplast precursor.

9. The process according to claim 8, wherein the particles of the hard solid material are dispersed in the aqueous solution of aminoplast precursor.

10. The process according to claim 8, wherein the particles of the hard solid material are scattered on the first cover sublayer of aminoplast precursor prior to pre-drying.

11. The process according to claim 10, wherein the hard solid material is selected from aluminium oxide, silicon dioxide, silicon carbide and boron nitride.

12. The process according to claim 11, wherein the mean particle size of the hard solid material is 180 to 220 μm.

13. The process according to claim 12, wherein the thickness of the first cover sublayer of aminoplast precursor is less than the mean particle size of the hard solid material while the thickness of the cover layer is greater than said particle size.

14. The process according to claim 13, wherein nanoparticles are incorporated at least in the last cover sublayer of the aminoplast precursor.

15. The process according to claim 14, wherein nanoparticles comprise aluminium oxide or silicon dioxide.

16. The process according to claim 15, wherein the nanoparticles are of a size of 5 to 100 nm.

17. The process according to claim 1, wherein the decorative layer is applied to the plate-shaped core by applying a layer of liquid glue onto the core and then placing a decorative paper thereon.

18. The process according to claim 1, wherein the decorative layer is applied to the plate-shaped core by gluing a one-colored paper on the plate-shaped core and subsequently printing upon the paper a decoration prior to step (b).

19. The process according to claim 18, wherein a urea-formaldehyde glue is used for gluing on the one-colored paper.

20. The process according to claim 18, wherein a direct or indirect intaglio printing, flexoprinting, offset printing or digital printing method is used for printing the decoration.

21. The process according to claim 20, wherein printing is inkjet printing.

22. The process according to claim 1, wherein a stabilizing layer is applied simultaneously with the application of the decorative layer on the side of the plate-shaped core opposite to the decorative layer.

23. The process according to claim 22, wherein the stabilizing layer is formed from a plurality of stabilizer sublayers of an aminoplast precursor which are respectively pre-dried prior to application of the next stabilizer sublayer.

24. The process according to claim 23, wherein the stabilizer sublayers are applied simultaneously with each cover sublayer and pre-dried.

25. The process according to claim 24, wherein a paper layer is applied prior to application of the stabilizing layer on the side of the plate-shaped core, that is opposite to the decorative layer.

* * * * *

UNITED STATES PATENT AND TRADEMARK OFFICE
CERTIFICATE OF CORRECTION

PATENT NO.        : 8,366,854 B2                                                                 Page 1 of 1
APPLICATION NO. : 12/809514
DATED             : February 5, 2013
INVENTOR(S)       : Carsten Buhlmann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 233 days.

Signed and Sealed this

First Day of September, 2015

Michelle K. Lee
*Director of the United States Patent and Trademark Office*